United States Patent
Bornhorst

(10) Patent No.: US 8,602,596 B2
(45) Date of Patent: *Dec. 10, 2013

(54) ULTRAVIOLET INFRARED FILTER

(75) Inventor: James Bornhorst, Dallas, TX (US)

(73) Assignee: Production Resource Group, LLC, New Windsor, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,694

(22) Filed: Jun. 12, 2012

(65) Prior Publication Data

US 2012/0262924 A1      Oct. 18, 2012

Related U.S. Application Data

(62) Division of application No. 12/118,556, filed on May 9, 2008, now Pat. No. 8,197,095.

(51) Int. Cl.
*F21V 9/04*       (2006.01)
*F21V 9/06*       (2006.01)

(52) U.S. Cl.
USPC ............................................................. 362/293

(58) Field of Classification Search
USPC .......... 362/583, 293, 297–307; 359/350, 351, 359/355, 359–361
See application file for complete search history.

(56) References Cited

U.S. PATENT DOCUMENTS

| | | | |
|---|---|---|---|
| 1,837,091 A | 12/1931 | Adams | |
| 3,686,940 A | 8/1972 | Kockott | |
| 3,737,226 A | 6/1973 | Shank | |
| 3,757,101 A | 9/1973 | Semotan | |
| 4,535,394 A | 8/1985 | Dugre | |
| 4,747,645 A | 5/1988 | Rudzki | |
| 4,974,136 A | 11/1990 | Noori-Shad et al. | |
| 5,408,398 A | 4/1995 | Chang | |
| 5,738,427 A * | 4/1998 | Booth et al. | 353/57 |
| 5,798,805 A | 8/1998 | Ooi et al. | |
| 5,844,638 A | 12/1998 | Ooi et al. | |
| 5,938,307 A | 8/1999 | Hamada et al. | |
| 5,982,497 A | 11/1999 | Hopkins | |
| 6,135,598 A | 10/2000 | Hamada et al. | |
| 6,326,998 B1 | 12/2001 | Palum | |
| 6,481,881 B2 * | 11/2002 | Tiesler-Wittig | 362/554 |
| 6,585,399 B2 | 7/2003 | Kreutzer et al. | |
| 7,048,387 B2 * | 5/2006 | Wei et al. | 353/99 |
| 7,063,423 B2 | 6/2006 | Fujimori et al. | |
| 7,137,708 B2 * | 11/2006 | Gupta | 353/84 |
| 7,497,594 B2 * | 3/2009 | Nagarekawa et al. | 362/268 |
| 8,197,095 B2 * | 6/2012 | Bornhorst | 362/293 |
| 2002/0015305 A1 * | 2/2002 | Bornhorst et al. | 362/293 |
| 2003/0173503 A1 | 9/2003 | Tocci et al. | |
| 2004/0032739 A1 * | 2/2004 | Johanson | 362/304 |
| 2004/0207997 A1 | 10/2004 | Stewart et al. | |
| 2005/0122721 A1 | 6/2005 | Hori | |
| 2005/0141222 A1 * | 6/2005 | Yang et al. | 362/293 |
| 2005/0265027 A1 | 12/2005 | Wu et al. | |
| 2006/0033439 A1 * | 2/2006 | Luttio | 313/634 |
| 2006/0039161 A1 * | 2/2006 | Saccomanno | 362/583 |
| 2006/0158898 A1 | 7/2006 | Cheng et al. | |
| 2007/0211468 A1 | 9/2007 | Allegri | |

* cited by examiner

*Primary Examiner* — Mark Consilvio

(74) *Attorney, Agent, or Firm* — Law Office of Scott C. Harris, Inc.

(57) ABSTRACT

A two-dimensional wedge shaped UV and IR filter is formed by or substantially same size pieces of glass forming a two-dimensional wedge. The wedge reflects radiation in four different directions.

2 Claims, 2 Drawing Sheets

ULTRAVIOLET INFRARED FILTER

BACKGROUND

In stage lighting devices, one object is to obtain as much output lighting effect as possible from the light. The optical systems often produce large amounts of light. The projected light includes visible part but also includes large amount of heat therein.

FIG. 1 illustrates a prior art attempted solution to this problem. The light source 100 may produce a light output of 700 W or more output.

The light beam is coupled to an ultraviolet/infrared filter, which rejects the passage of at least one of IR or UV components therethrough. The output light 120 is cleansed, as much as possible, of non-visible light. This light may be further processed by light altering elements, e.g., the gobo 130.

It was found by the inventor, however, that the FIG. 1 system causes rejected energy to pass back to the lamp 100.

SUMMARY

The present application describes a UV IR filter that addresses many of these problems.

An embodiment discloses a pyramid shaped radiation filter.

DETAILED DESCRIPTION

Figure 1:
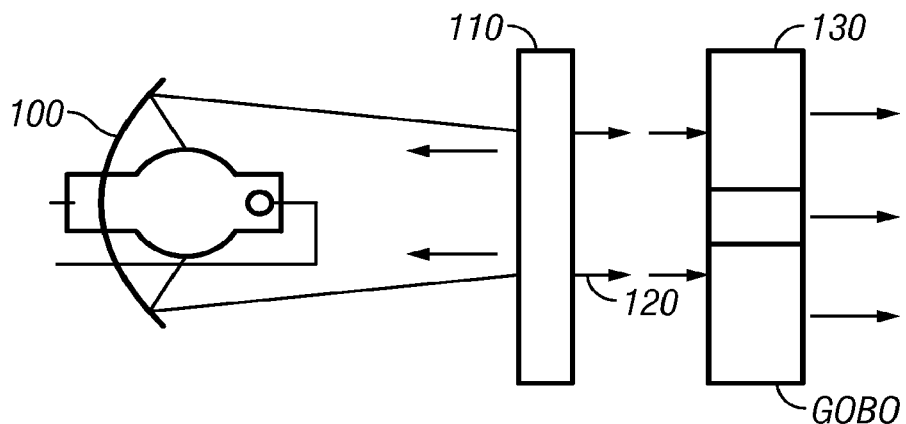
FIG. 1 shows a prior art embodiment of a radiation filter.
Figure 2:
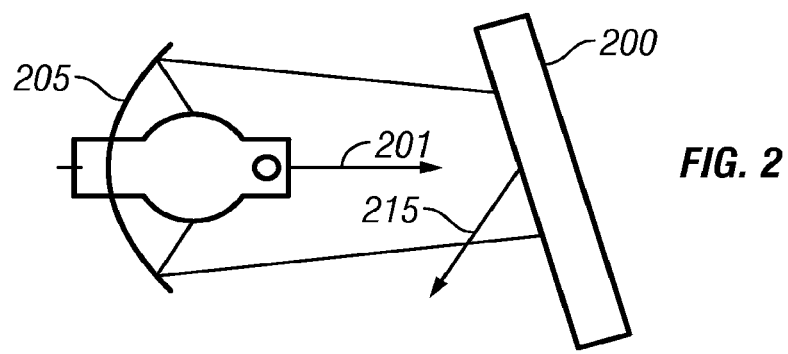
FIG. 2 shows a first embodiment where radiation is reflected at an angle relative to the optical axis.

An embodiment shown in FIG. 2 addresses this issue by angling the IR filter 200 relative to the lamp 205 at an angle that is neither perpendicular nor parallel to the axis 201 of the light beam. The light output from the lamp, therefore, is sent in a direction shown as 215, rather than being sent back to the lamp.

This system effectively couples the energy to different location (i.e., not back to the lamp). However, this arrangement may takes up extra space due to the angled filter 200. Also, it requires that the energy be directed to another location, and hence that other location needs to be capable of handling the significant heat output.

Figure 3:
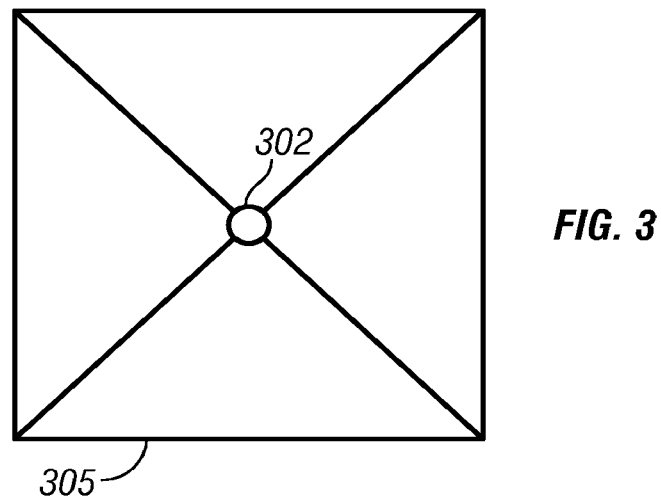
FIG. 3 shows an embodiment of a multisided radiation filter shaped like a pyramid.

Another embodiment, shown in FIG. 3 uses a two-dimensional wedge formed of four pieces of radiation reflecting material to form a pyramidal shaped filter. FIG. 3 shows the pyramidal filter formed from four pieces of cold mirror material, e.g, glass. In the embodiment, each piece of glass is in the shape of a triangle, and there is a small hole 302 in the middle where the triangles come together in the "shadow" of the bulb. FIG. 3 shows how the combination of these triangular forms is put together in the shape of a two-dimensional wedge. Each portion of the glass such as 305 is a flat piece of glass, but each portion directs the light in a different direction.

Figure 4:
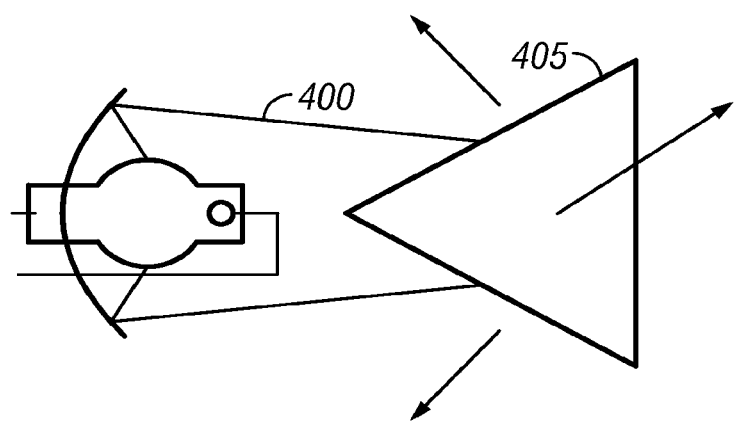
FIG. 4 shows how the pyramid filter reflects light.

FIG. 4 illustrates how the light beam 400 is impinging on this two-dimensional wedge, so that one portion 405 directs the light beam in a first direction, another portion in another direction. The double wedge formed of four pieces of filter material forms four separate angular directions of directing the light, thereby dividing up the energy into four different directions. Each piece of material preferably forms the same angle with the optical axis, but in a different orientation to reflect the light in a different direction.

Another embodiment may use a cone of glass as the filter to reflect the light in multiple different directions.

Another embodiment may use a number of flat pieces of glass (e.g., 16 or 32 triangular shaped pieces) which approximate a cone, so that the cone of light intersects the cone of glass.

Opening 302 may be located in the center of the reflector, at a location of the shadow of the lamp. This also allows the filter to expand and contract.

In one embodiment, the wedge may form a 10° horizontal angle. The UV IR filters may be tuned for angle of incidence for where the cone of light intersects the pyramid. Another embodiment may use an average angle of incidence of 12°.

Figure 5:
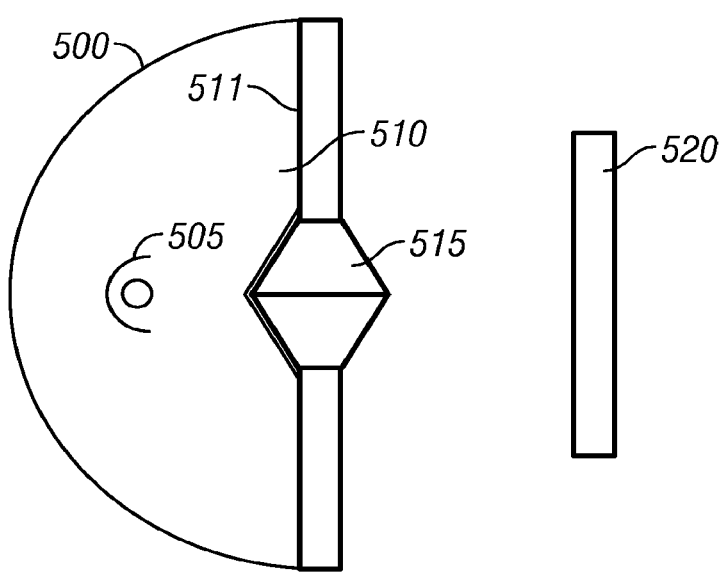
FIG. 5 shows an embodiment where the light is sealed within a thermal area.

FIG. 5 illustrates an embodiment having a sealed area 500 including the lamp and reflector assembly 505. A thermal barrier 510 is formed by a thermally isolating shield 511, and the pyramid shaped filter 515. The optical components 520 downstream of the lamp receive light, but are isolated from the heat caused by the light beam.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other angle pyramids can be used, e.g., any angle between 10 and 25 degrees with reference to the horizontal might be usable. Also, an embodiment discloses a pyramid which has 4 directions of reflecting the light, a 4 sided structure. However, any number of sides can be used including 5, 8, 16 or any other number of sides. More sides creates more directions of reflection.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

The invention claimed is:

1. A method, comprising:
    projecting high-intensity light along an axis, said high-intensity light being from a source having at least 700 W of output; and
        filtering the high intensity light along said axis, to remove both ultraviolet and infrared along said axis, said filtering comprising reflecting said radiation in at least multiple different directions simultaneously using a single filter, where said filtering provides identical amounts of said ultra-violet and infrared filtering characteristics in each of said multiple directions, wherein said filtering is carried out using a number of separate surfaces that come together at an apex, and further comprising a hole at said apex, wherein said hole is at an area of a shadow created by said source in a direction of facing.

2. A lighting device, comprising:

a light source operating to produce high-intensity light along an axis, said high-intensity light being from a source having at least 700 W of output; and a light filter with multiple different surfaces, where each of said multiple surfaces face in a different direction, and said surfaces are located along said axis, said light filter filtering to remove both ultraviolet and infrared along said axis, by reflecting said high intensity light in at least multiple different directions simultaneously using a single filter, and where each of said multiple surfaces provides identical amount of ultraviolet and infrared filtering, wherein each of said multiple surfaces are separate materials that come together at an apex, wherein there is a hole at said apex, and wherein said hole is at an area of a show created by said light source.

\* \* \* \* \*